Sept. 9, 1924.  1,507,738
A. B. JOHNSON
FORCEPS
Filed Jan. 12, 1923

Inventor
Albert Baxter Johnson,
By Louis M. Schmidt
Atty.

Patented Sept. 9, 1924.

1,507,738

UNITED STATES PATENT OFFICE.

ALBERT BAXTER JOHNSON, OF NEW BRITAIN, CONNECTICUT.

FORCEPS.

Application filed January 12, 1923. Serial No. 612,293.

*To all whom it may concern:*

Be it known that I, ALBERT BAXTER JOHNSON, a citizen of the United States, residing at New Britain, in the county of Hartford and State of Connecticut, have invented certain new and useful Improvements in Forceps, of which the following is a specification.

My invention relates to improvements in forceps for dental use and of the form that is known as elevating forceps for operating upon the third lower molar by displacing the tooth to facilitate the removal thereof by the use of extracting forceps, the device being related to part of the structure shown and described in the patent issued to myself November 1, 1921, No. 1,395,714, which latter showed a combination of elevating and extracting jaws or beaks and involving a double acting structure, and the object of my improvement is to produce an elevator forceps that is adapted to operate particularly upon impacted third molars by reason of the special construction and arrangement of the beaks or jaws, involving the details of the shaping of the individual jaws and cooperating relation of the one to the other, involving, furthermore, in the final closed or closing position an overlapping of the tips or points.

In the accompanying drawing:—

Figure 1:
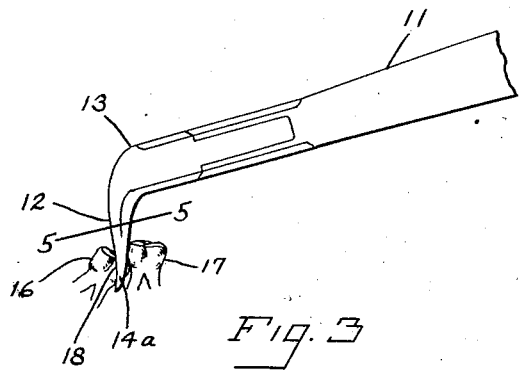
Figure 1 is a side elevation of a pair of forceps made in accordance with my invention and in position of engagement with the third lower molar to be extracted and the adjacent second molar, and which third molar is in the condition of what is termed an impacted molar or wisdom tooth.
Figure 2:
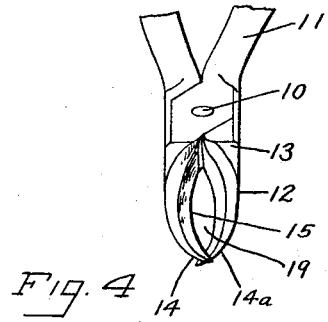
Figure 2 is an end elevation of the same as viewed from the end having the jaws.
Figure 3:
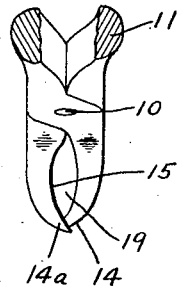
Figure 3 is a rear elevation of the same.
Figure 4:
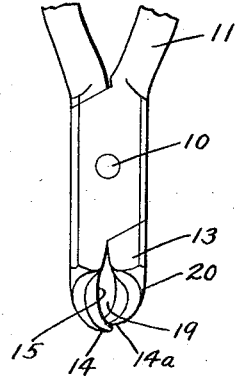
Figure 4 is a plan view of the same.
Figure 5:
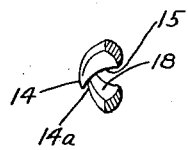
Figure 5 is a sectional view of the jaws on the line 5—5 of Fig. 1.
Figure 6:
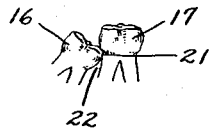
Figure 6 is a side elevation of the impacted molars shown in Fig. 1.

My improved forceps comprise a pair of crossed members that are pivotally connected by a pin 10 at the intersection, having handles 11 at one end and having the jaws or beaks 12 at the other end.

The beaks 12 are supported by a short shank 13 that extends outwardly from the pivotal pin 10 and they are directed downwardly, in pendant position relatively to the shanks 13 and the handles 11.

The beaks 12 are substantially similar, except that one is right-handed and the other left-handed, and the further provision that there is a slight though appreciable off-set of one relatively to the other so that in the closing or closed position the tips will pass or overlap one another.

In the structure shown the right-hand tip 14 is in front of the left-hand tip 14$^a$ in the closed position.

The tips are relatively sharp, the jaw as a whole being of tapered form generally from said tips 14 and 14$^a$ towards the supporting shanks 13. Also, the cross-section of the jaws or beaks 12 is wedge-shaped, with the sharp edges 15 opposed and adjacent. These conditions serve to effect a wedging on the tooth 16 to be extracted in cooperation with the second molar 17.

As a further detail, the active portion 18, adjacent the tip of each beak 12 has a pronounced bend in the forward direction, resulting in further displacement of the tooth 16 as the jaws are closed.

In order to facilitate the engagement of the beaks 12 with the under side of the tooth 16 there is a generally divergent relation of the active portions 18 from the tips 14 and 14$^a$ rearwardly, denoted by a generally wedge-shaped space 19 between them. This form is obtained by providing for the jaws or beaks 12 as a whole a form that may be variously described as curved, crescent-shaped, bowed, or cow-horn shaped. Thus the entire beak structure 12 is in each case curved from the tip 14 or 14$^a$ back along the active portion 18 and continued also along the base 20 of each, said base 20 being connected with the shank 13.

By reason of having the tips 14 and 14$^a$ pass by one another, as described, the crescent-shaped feature of the beaks 12 can be and is made more pronounced than would otherwise be permissible.

By reason of the passing by of the tips 14 and 14$^a$ in the final closing operation of the jaws 12 there is effected a twisting or torsional movement of the tooth 16 which is particularly effective in shifting the tooth 16 from its impacted position.

The impacted condition mentioned involves an angular position of the third molar 16 and contact of the top portion thereof with the second molar as shown at 21, leaving an angular space 22 between the two on the lower side of the contacting portions 21.

My improved forceps are adapted for entering said space 22 and thus operating in an efficient manner on the tooth to be removed.

I claim as my invention:—

1. Forceps for operating upon impacted third lower molars comprising a pair of pivotally connected members having each a handle on one side of the pivotal connection and a beak at the other side thereof, said beaks being generally similar in form and construction except that the one is right-handed and the other left-handed; having relatively sharply pointed tips; having a tapered form for the portion that serves as the active portion, adjacent said tips; having a wedge-shape form of cross-section for said active portion; and having as a whole a generally crescent-shape, whereby said active portions in the position for use, with the tips opposed, are directed generally divergent relatively to said tips.

2. Forceps for operating upon impacted third lower molars comprising a pair of pivotally connected members having each a handle on one side of the pivotal connection and a beak at the other side therof, said beaks being substantially similar in form except that one is right-handed and the other left-handed, said beaks comprising each an active portion adjacent the tip, and said active portion having in each case a pronounced bend in the forward direction from the base, on the side of the pivot, outwardly to the said tip, whereby in use there will result a corresponding displacement of the tooth being operated upon as the jaws are closed.

3. Forceps for operating upon impacted third lower molars comprising a pair of pivotally connected members having each a handle on one side of the pivotal connection and a beak at the other side thereof, said beaks being substantially similar in form except that one is right-handed and the other left-handed and comprising each an active portion adjacent the tip that is of tapered form from said tip inwardly so as to be adapted to be forcibly entered between the tooth being operated upon and the next adjacent tooth, and said active portions being off-set relatively one to the other so that in the closing positions said tips will be out of registration and will pass by one another and a twisting or torsional movement of the said tooth will be effected.

4. Forceps for elevating use comprising cooperating beaks, said beaks comprising each an active portion adjacent the tip in the form of a tapered, horn-like structure that terminates at said tip as a sharply pointed structure, and the two tips being out of registration so as to pass by one another at and adjacent the fully closed position.

5. In forceps as described in claim 1, said active portions being positioned in off-set relation one to the other so that at and adjacent the fully closed position the tips will be out of registration and will overlap.

6. Forceps for operating upon impacted third lower molars comprising beaks that are supported by a pair of pivotally connected members, said beaks individually being provided with a sharp pointed tip, having a wedge-shaped form of cross-section inwardly from said tip, and having a sharp border edge that is opposed to a similar edge on the mating member and in each case extends inwardly from said tip along the wedge-shaped portion, and said beaks being curved both longitudinally and laterally so that said border edges are divergent from said tip inwardly and are individually of curved form.

7. Forceps as described in claim 6, said tips being positioned out of alignment so as to pass by one another and overlap in and adjacent the closed position.

ALBERT BAXTER JOHNSON.